(No Model.) 2 Sheets—Sheet 1.

J. E. SIMPSON & J. H. SHAFFER.
AUTOMATIC GRAIN WEIGHING APPARATUS.

No. 368,310. Patented Aug. 16, 1887.

Witnesses
Norris A. Clark.
A. L. Browne

Inventors
John E. Simpson and
James H. Shaffer
by Soulé and Co.
attys.

(No Model.) 2 Sheets—Sheet 2.
J. E. SIMPSON & J. H. SHAFFER.
AUTOMATIC GRAIN WEIGHING APPARATUS.

No. 368,310. Patented Aug. 16, 1887.

Witnesses.
Norris A. Clark
A. S. Browne

Inventors.
John E. Simpson and
James H. Shaffer
by Soulé and Co.
Attys.

UNITED STATES PATENT OFFICE.

JOHN E. SIMPSON AND JAMES H. SHAFFER, OF BUTLERVILLE, OHIO.

AUTOMATIC GRAIN-WEIGHING APPARATUS.

SPECIFICATION forming part of Letters Patent No. 368,310, dated August 16, 1887.

Application filed March 22, 1887. Serial No. 231,927. (No model.)

*To all whom it may concern:*

Be it known that we, JOHN E. SIMPSON and JAMES H. SHAFFER, of Butlerville, Warren county, Ohio, have invented Improvements in Automatic Grain Weighing and Measuring Machines, of which the following is a specification.

The invention is illustrated in the accompanying drawings, in which—

Figure 1:
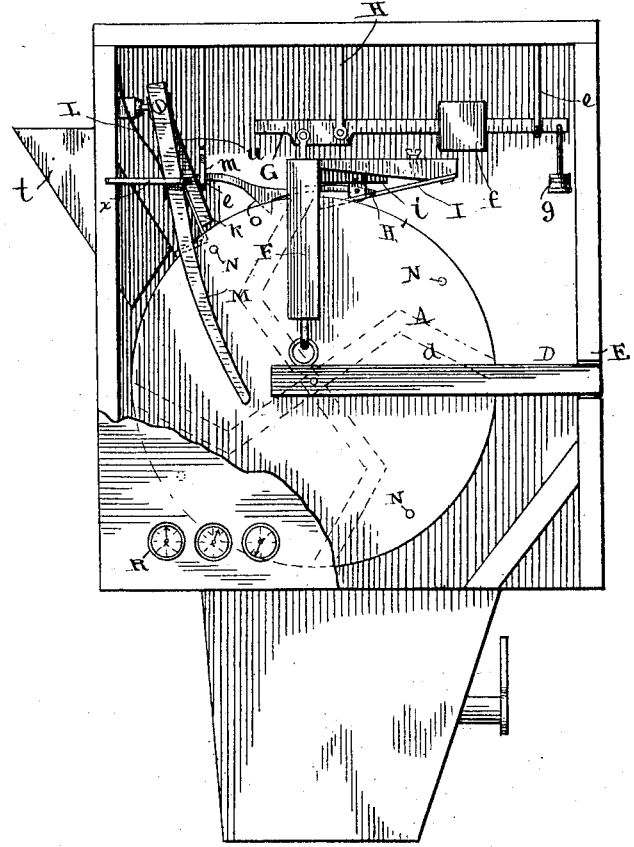
Figure 2:
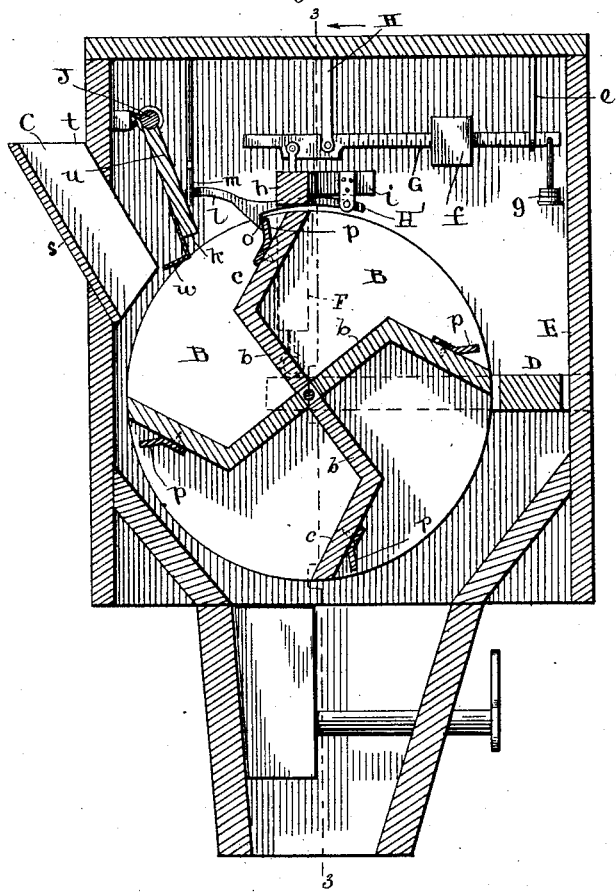
Figure 3:
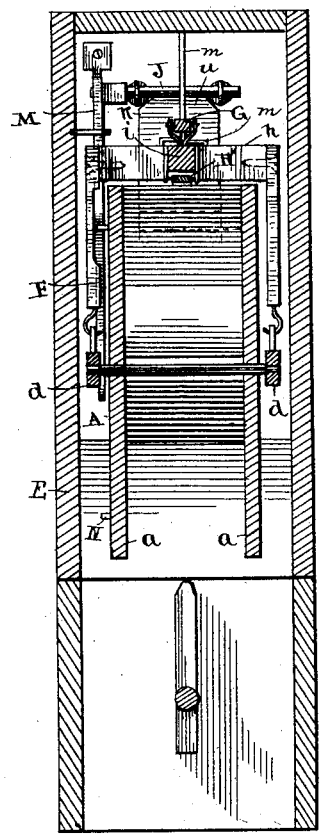

Figure 1 is a side view with the casing removed. Fig. 2 is a vertical section, and Fig. 3 is a cross-section.

The measuring-vessel consists in a rotary measurer, A, divided into a series of compartments, B B, four (the number shown) being a suitable number. The measurer A is formed of two circular disks, $a$ $a$, which are connected by two radial partitions, $b$ $b$, crossing each other at right angles at the centers of the disks and reaching about half-way to the periphery of the disks. At the outer ends of the partition $b$ $b$ are four partitions, $c$ $c$, which extend at an angle of about one hundred and twenty degrees to the peripheries of the disks. The measuring-compartments B B thus formed are by the rotation of the measurer brought successively into co-operation with a feed-chute, C, and when each compartment has been filled by a predetermined amount the measurer is automatically turned, the compartment discharged, and the next compartment brought under the feed-chute.

The measurer A is journaled in two horizontal arms, $d$ $d$, of a frame, D, which is pivoted to the inclosing and supporting casing E. The free outer ends of the arms $d$ $d$ are suspended by a yoke-frame, F, from the short arm of a weighing-lever, G. This lever is pivoted near the point where the yoke-frame F is suspended to a depending bracket, H. The long arm of the lever G moves between suitable guides, as indicated at $e$. This weighing-lever G can be adjusted to weigh different amounts by means of either a sliding weight, $f$, or by a weight-holder and detached weights $g$, or by both conjointly. The weights on the weighing-lever or scale-beam are arranged according to the desired amounts which it is desired to weigh or measure. When the desired amount of grain or other material has been fed into one of the measuring-compartments, it overbalances the scale-beam and permits the measurer A to descend. When in its normal raised position, the measurer is held by a catch from rotation. The descent of the measurer, however, releases it from the catch and permits its rotation.

The catch mechanism for holding the measurer from rotation when in its higher position is as follows: To the upper bar, $h$, of the yoke-frame F is attached an arm, $i$, extending in a horizontal direction on the side away from the chute. To the outer end of this arm is pivoted one end of the catch-bar H'. This bar extends toward the chute between the rotary measurer and the bar $i$ of the yoke-frame, and its outer end, $l$, rests movably in a fixed loop, $m$, supported by the fixed casing. Between its two ends the catch-arm is formed or provided with a downwardly-extending catch, $o$. Co-operating with the catch are a series of lips, $p$ $p$, on the outer edges of the advanced sides of the partitions $c$ $c$. When the measurer is in its higher position, the catch $o$ is in the path of the lips $p$ $p$, and, being encountered by the same, prevent the rotation of the measurer. When, however, the measurer descends under the weight of the grain, the pivoted end of the catch-bar descends an equal distance. The end $l$ of the bar is, however, held from any descent, and as a result the lip $p$, in contact with the catch $o$, is lowered beneath and out of engagement with the catch. When the grain is emptied, the measurer again ascends, and the succeeding lip encounters the catch and holds the measurer again in position.

In order that the rotation of the measurer may be checked, so that the lips $p$ will not strike too heavily against the catch and thus possibly move it out of position, a retarding-spring, I, is employed, which is secured to and supported by an arm attached to the yoke-frame F. This spring is encountered by the outer edges of the partitions $c$ $c$ just before the lips $p$ $p$ strike the catch and cushion the measurer. This cushioning or buffer spring also accomplishes another important object. In weighers of this class where a rotary measurer is mounted in a swinging frame suspended from a scale-beam and held from rotation during the filling process by a catch, after being emptied the measurer must be lifted a certain distance before it again encounters the catch. It is important, therefore, that the rotation should be stopped by the catch when the measurer is in the proper position, otherwise the grain pouring from the feed-spout will not be properly fed into the measurer. This cushioning-spring prevents this, because, owing to its relative position, it insures the rotation of the measurer being stopped when the lips $p$ strike the catch, and also prevents the rebounding of the measurer, which would prevent the measurer occupying the proper position in relation to the feed-spout.

In order that the flow of grain or other material through the chute may be checked during the rotation of the measurer an automatic valve is provided for the chute. The chute is arranged with a bottom, $s$, and sides $t\,t$. Above the opening in the casing where the chute enters is journaled a cross-shaft, J. To this shaft is secured the valve $k$, which consists of a plate, $u$, the lower end of which is held between the sides of the chute and a projecting flange, $w$, which extends partly across the chute. This valve is held normally away from the bottom of the chute by a spring, L, so that normally the chute is unobstructed. Also, secured to the shaft J is a downwardly-extending lever, M, against which the spring L bears, and which is limited in its movement by a stop, $x$, on the casing. The lower end of this lever reaches down beside one of the disks $a$ of the rotary measurer, and it is adapted to be encountered by a series of studs, N N, fixed to said disk at proper positions and intervals to effect the closing of the valve at the proper time. When in the rotation of the measurer one of these studs encounters the lever M, the latter is turned, thus rotating the shaft J and moving the valve in so that its flange $w$ touches the bottom of the chute, thus obstructing the same. The valve is held closed in this manner until the next compartment of the measurer is brought into proper position. The stud in contact with the lever has by that time passed below the end of the lever, which, being thus released, is pressed back, together with the valve, into its normal position by the spring L.

The discharge-spout is preferably double with a swinging gate for directing the grain into either of the two spouts.

A registering attachment may also be provided of any well-known construction to be actuated by the rotation of the measurer. Such an attachment is indicated at R.

We claim as our invention—

1. The frame D, having horizontal arms $d\,d$ and pivoted to the inclosing-casing, a rotary measurer, A, divided into a series of measuring-compartments by cross-partitions $b\,b\,c\,c$, said measurer being rotatively mounted in and between said arms $d\,d$, a pivoted scale-beam, G, and a yoke-frame, F, suspended from said scale-beam, to the lower ends of which the free outer ends of said arms $d\,d$ are attached, in combination with arm $i$, attached to the upper part of said yoke-frame above the measurer, a catch-bar, H', having a depending catch, $o$, said catch-bar being pivoted at one end to said arm $i$, and being supported at the other end from the fixed casing, and lips $p\,p$ on the outer edges of the cross-partitions of the measurer, which co-operate with said catch $o$, substantially as set forth.

2. The feed-chute and the rotary measurer fed therefrom, said measurer having fixed studs N N thereon, in combination with a shaft, J, journaled above and across the mouth of said chute, a valve-plate, $u$, carried by said shaft and adapted to open and close said chute when the shaft is rotated, a spring, L, acting on said shaft to hold said valve away from the chute to open the same, and a lever, M, fixed to said shaft, which is encountered by said studs N N, substantially as set forth, whereby said shaft is rotated to shut the valve.

In witness whereof we have hereunto signed our names in the presence of two subscribing witnesses.

JOHN E. SIMPSON.
JAMES H. SHAFFER.

Witnesses:
THOMAS N. LUCKETT,
ELMER E. WHITACRE.